Jan. 2, 1968
H. C. HARBERS
3,361,444
RESILIENT SUSPENSION SYSTEM FOR USE BETWEEN
A TRUCK BODY AND CHASSIS FRAME
Filed Oct. 23, 1965
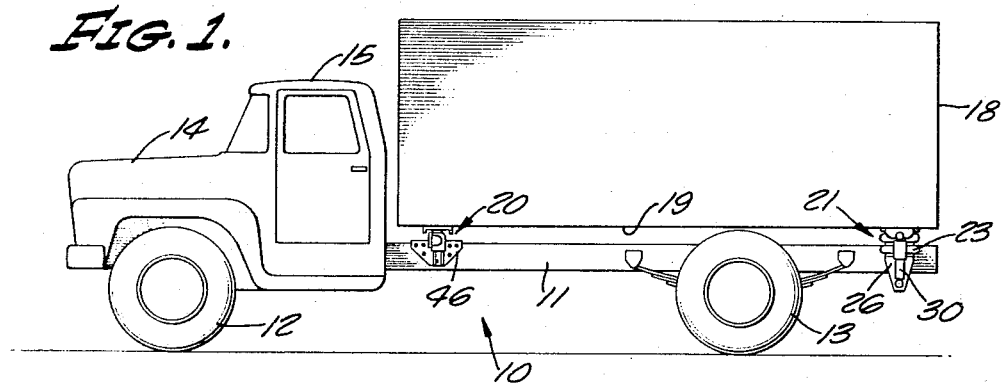
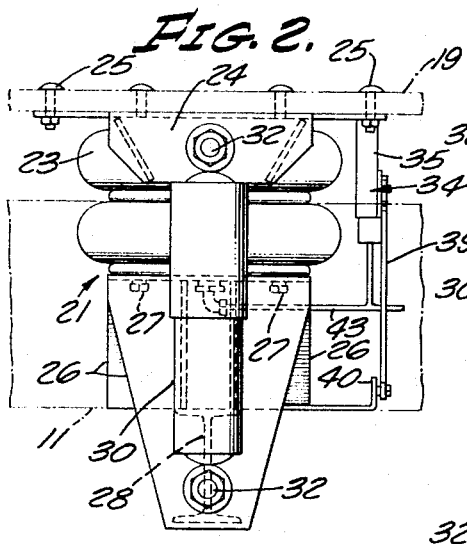
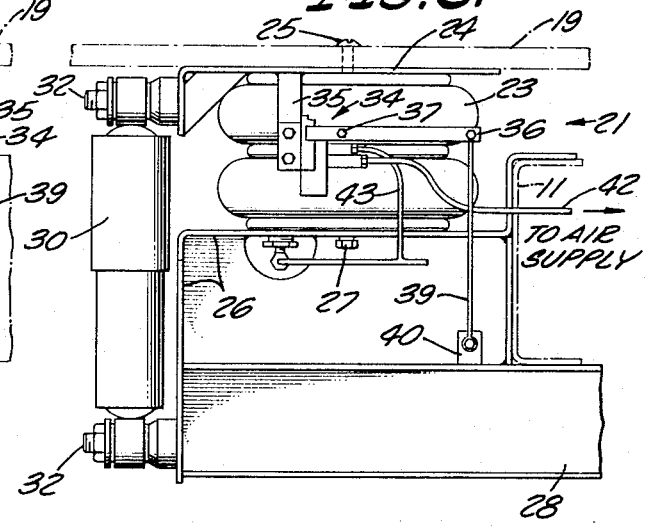
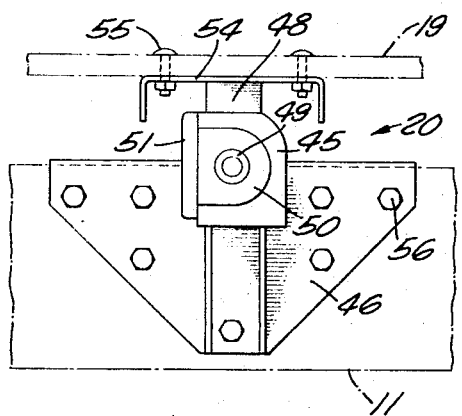
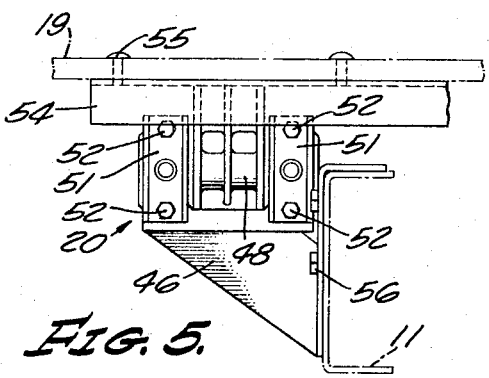
INVENTOR.
HENRY C. HARBERS
BY
ATTORNEY

United States Patent Office

3,361,444
Patented Jan. 2, 1968

3,361,444
RESILIENT SUSPENSION SYSTEM FOR USE BETWEEN A TRUCK BODY AND CHASSIS FRAME
Henry C. Harbers, Pasadena, Calif., assignor to Western Unit Corporation, City of Industry, Calif., a corporation of California
Filed Oct. 23, 1965, Ser. No. 503,806
10 Claims. (Cl. 280—106.5)

ABSTRACT OF THE DISCLOSURE

This invention relates to motor vehicles and more particularly to a resilient suspension for use between a truck body and the chassis frame and operating to provide a soft ride for the cargo irrespective of the wide-range variation in loading and the nature of the chassis suspension system. Desirably, self-adjusting air springs are employed and are readily installable on either original or used equipment without need for making any alterations in the suspension assembly of the chassis proper. According to one mode of use the essential components for practicing the invention are supplied as a kit of accessories ready for securement by welding, riveting or the like between the cargo carrier and the frame of the chassis without altering or molesting the carriage suspension assemblies in any respect.

---

Many advantages and superior soft riding characteristics are afforded by regulatable air springs forming part of vehicle chassis carriage suspension systems. It not infrequently happens that the vehicle owner or purchasers acquires a vehicle without air springs. It is a costly procedure to convert such a vehicle to incorporate air springs. Even if the vehicle is equipped with a carriage assembly incorporating air springs, it is well known that the chassis has a useful life of much shorter duration than the cargo body. For this reason several sets of air springs are required during the life of the cargo body.

In view of the foregoing disadvantages and shortcomings of cargo vehicles as heretofore proposed it is a primary purpose of the present invention to provide a simple set of inexpensive accessories easily installable on any conventional truck chassis between its main frame and the cargo body and effective in providing substantially the same soft riding characteristics under widely varying load conditions previously obtainable through use of far more costly constructions utilizing air springs in the carriage suspension system of the vehicle chassis proper. The resilient suspension accessories utilized in practicing the present inventive concept are light in weight, inexpensive, and readily installed by any mechanic directly to the chassis frame of existing equipment without need for alteration or disassembly of any part of its suspension components. After the chassis on which the accessories have been installed has served its normal useful life, its body, along with the invention accessories are readily transferred to another truck chassis at small cost.

It is therefore an object of the present invention to provide a set of accessories in the form of simple inexpensive resilient couplings for use in resiliently coupling a cargo body to a vehicle chassis.

Another object of the invention is the provision of a vehicle having a plurality of controllable air springs interconnecting the chassis frame and a cargo body for the vehicle.

Another object of the invention is the provision of a cargo vehicle utilizing a conventional suspension means between its main frame and the wheels thereof and having a cargo carrying body detachably connected to the frame through resilient coupling means and including load sensing means for varying the carrying capacity thereof as the loading varies.

Another object of the invention is the provision of resilient means for coupling a cargo body to a vehicle frame and including a first pair of resilient couplings hingedly connecting one end of the body to the frame while restraining relative movement of the body and frame transversely of the vehicle and a second pair of couplings incorporating height controlled air springs operable to provide a soft ride for cargo carried in the body.

These and other more specific objects will appear upon reading the following specification and claims and upon considering in connection therewith the attached drawings to which they relate.

Referring now to the drawings in which a preferred embodiment of the invention is illustrated.

FIGURE 1 is a side elevational view of a typical cargo vehicle equipped with the present invention;

FIGURE 2 is a fragmentary view on an enlarged scale of one of the air spring couplings;

FIGURE 3 is a view similar to FIGURE 2 but taken from the rear end of the vehicle;

FIGURE 4 is an enlarged end elevational view of one of resilient couplings supporting the one end of the cargo body; and FIGURE 5 is an elevational view from the left side of FIGURE 4.

Referring more particularly initially to FIGURE 1, there is shown a conventional motor vehicle, designated generally 10, having a main frame 11 resiliently supported by a pair of steerable front wheels 12 and a typical rear suspension assembly 13. Mounted across the front end of frame 11 is a housing 14 enclosing the propelling motor and a driver's cab 15. Vehicle 10 also includes any suitable type of cargo carrying body here represented by a van 18.

It will be understood that the cargo body may comprise constructions of many varying types and designs. As here shown, the van body is a rigid unitary structure having a top, side walls and a front end wall interconnected by a bottom 19. Normally this body would be secured directly to frame 11 by suitable bolts and brackets. According to the present invention bottom 19 of the body is shown elevated somewhat above the top edge of frame 11 and is rigidly connected thereto by resilient coupling means featured by this invention. Typically and by way of example these coupling means as herein shown comprise a pair of resilient hinging forward couplings 20 and a pair of air spring couplings 21.

The air spring units 21 are best shown in FIGURES 2 and 3 and include any suitable type of inflatable bellows 23. Rigidly secured to the upper end of each bellows is a mounting bracket 24 having flanges by which the bracket may be secured by bolts 25 to bottom 19 of the cargo body. Other suitable bracket means 26 is secured to the bottom of each bellows by fasteners 27. As here shown by way of example, brackets 26 are designed for securement to the exterior sides of the chassis frame members 11. Brackets 26 may include a cross brace 28 extending crosswise and beneath the main frame and are secured to the chassis frame by bolts, rivets, welding or otherwise, but desirably in such manner as to be readily removable for transfer of the cargo body to another chassis after the one chassis becomes unserviceable.

Brackets 24 and 26 also preferably include a shock absorber 30 extending generally vertically alongside each air bellows and pivotally connected to brackets 24, 26 by studs 32.

An important accessory associated with the several air springs is an automatic height-control valve 34 of any conventional type operating in known manner to maintain the air springs at substantially the same operating height irrespective of widely varying loads on these springs. A single valve suffices for controlling the admission of pressurized air to a pair of the springs located on either side of the vehicle frame. Valve 34 includes a mounting bracket 35 rigidly secured to one end of the spring as upper bracket 24. The load sensing means for the valve comprises a lever 36 pivotally supported on the valve housing by pivot pin 37 and having a connecting link 39 connecting its right hand end, as viewed in FIGURE 3, to lower bracket 26 through a bracket 40. Lever 36 will be understood as operable in known manner to admit pressurized air to bellows 23 when pivoted counterclockwise and to release air therefrom when pivoted clockwise. Valve 34 may be of any well known type, such as that disclosed in Harbers et al. Patent 3,063,732, granted Nov. 13, 1962.

Valve 34 receives pressurized air from a suitable source through supply line 42 and operates to supply additional air upon need to each of the air bellows through the common distribution pipe 43. Valve 34 also includes a port, not shown, for venting pressurized air from the bellows to the atmosphere in response to reduction in the load on the spring and as necessary to maintain lever 36 normally in a neutral or closed position.

Referring to FIGURES 4 and 5, there is shown a typical and suitable form of resilient hinge couplings 20 useful in resiliently supporting one end of body 18 and serving to maintain the cargo body against side sway and lateral displacement relative to the chassis. It will be understood that one suitable type of coupling meeting these needs is that disclosed in detail in Henry C. Harbers et al. Patent 2,996,313, granted Aug. 15, 1961. This construction has a rigid main body of generally U-configuration 45 here shown as rigidly secured to a mounting bracket 46. A second main portion 48 of the coupling is generally T-shaped with the opposite ends 49 of its head portion socketed in rubber collars 50. These collars are held assembled under pressure in the cavity of main housing 45 by clips 51 and cap screws 52. The stem of the T-shaped member 48 extends upwardly and includes a base 54 by which the upper end of the coupling is secured by bolts 55 to floor 19 of the van. Bolts or cap screws 56 serve to secure lower bracket 46 detachably to frame member 11.

To install the described set of accessories on a vehicle, the user has but to drill holes in the sides of chassis frame 11 at appropriate points and to secure the lower mounting brackets of each of the couplings to the frame. Body 18 is then lowered against the upper set of brackets and secured in place by bolts 25, 55. All that remains is to connect the air supply line 42 to a source of pressurized air on the vehicle and install distributing pipe 43.

Valve 34 and the sensing control members 36, 39 are so adjusted that air springs 21, 21 support the body 18 at a desired level relative to frame 11 when empty. As a load is placed in the body, the sensing device responds and operates valve 34 to admit additional pressurized air to air bellows 23 to maintain the body supported at this same predetermined height. If a portion of the load is removed, the bellows tend to expand upwardly operating sensing links 36, 39 and the valve to vent a portion of the trapped air from the air springs to the atmosphere. As the air springs settle the escape of air is cut off and the air springs then function to provide a soft ride for the particular amount of cargo left on the vehicle.

Shock absorbers 30 cooperate with the air bellows in maintaining the load at the same general height above the chassis and avoid shock and bouncing movement of the body while passing over rough sections of the roadway.

The front pair of resilient couplings 20 also cooperate in cushioning the load and serve additionally and importantly in stabilizing the body against side sway and lateral movement. It will also be understood that an anti-sway bar or tracking bar may be pivotally connected crosswise of the rear end of the vehicle with one end pivoted to the frame and the other end pivoted to the underside of body 18.

It is also pointed out that the location of each of couplings 20, 21 on the exterior of the vehicle frame avoids any material increase in the overall height of the vehicle owing to the presence of the couplings. This location also aids materially in controlling side sway and lateral shift of the body relative to the chassis while negotiating turns.

While the particular resilient suspension system for use between a truck body and a chassis frame herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A motor propelled vehicle of the type having a chassis frame equipped with front and rear suspension assemblies, cargo carrying means overlying and vertically spaced from said chassis frame for limited vertical movement relative thereto, said vehicle being characterized by the provision of means including resilient means independent of said front and rear suspension assemblies interposed between the opposite ends of said cargo carrying means and the adjacent ends of said chassis frame, said resilient means including a plurality of air bellows having one end connected to said cargo carrying means and the other end connected to said main frame, and automatic valve means responsive to changes in loading present in said cargo carrying means to vary the quantity of pressurized air admitted to said air bellows and effective to maintain the height of said bellows generally constant thereby to provide a soft ride for the cargo irrespective of wide variation in the amount thereof present on said vehicle.

2. A motor vehicle as defined in claim 1 characterized in that there is at least one of said air bellows between each rear end corner of said cargo carrying means and the adjacent portion of said chassis frame.

3. A motor vehicle as defined in claim 2 characterized in that said air bellows are offset laterally from the exterior face of said chassis frame with the upper end thereof underlying and secured to said cargo carrying means.

4. A motor vehicle as defined in claim 1 characterized in the provision of shock absorber means operatively associated with each air bellows and having its lower end anchored to said chassis frame and its upper end anchored to the upper end of the associated air bellows.

5. A motor vehicle as defined in claim 1 characterized in that said means interposed between said chassis frame and said cargo carrying means includes a pair of resilient couplings with one thereof mounted on either side of said main frame and having one end of each connected to said cargo carrying means and the other end of each connected rigidly to said chassis frame to support the overlying portion of said cargo carrying means out of load bearing contact with said chassis frame.

6. A motor vehicle as defined in claim 1 characterized in that said means interposed between said chassis frame and said cargo carrying means includes a pair of resilient couplings located between one end of said cargo carrying means and the adjacent underlying portion of said chassis frame, and said motor vehicle being further characterized in that said air bellows are located remotely from said resilient couplings and cooperate therewith in supporting said cargo carrying means out of load bearing contact with said chassis frame.

7. An elongated cargo carrying body adapted to be detachably secured to and vertically spaced above the rearward portion of the frame of a vehicle chassis through a plurality of resilient load transmitting couplings, said couplings including a pair of couplings provided with means for securing one end of the same to the forward end of a cargo carrying body with their pivot axes in alignment transversely of said body and for securing the other end thereof to a chassis frame, and said couplings including a plurality of air bellows projecting downwardly from the underside of the rear end of said body along the opposite sides thereof at points remote from said pair of couplings and with their lower ends positioned for securement to a chassis frame independently of the other suspension means of a vehicle chassis, and means for admitting pressurized air to said air bellows.

8. A cargo carrying body as defined in claim 7 characterized in that said air bellows include load sensing means operable to sense change in the vertical height of said air bellows under varying loading conditions and including means for varying the pressurized air present in said air bellows to correspond with the actual load conditions in said body.

9. In combination, a kit of accessories for use in connecting a selected cargo carrying body to and vertically spaced above a selected motor vehicle chassis frame independently of the chassis suspension assemblies and operable to provide a soft ride for the body irrespective of the type of suspension assemblies present on the vehicle chassis, said kit comprising a pair of resilient couplings of the type having rubber interposed between and cooperating with relatively movable mounting brackets forming part of said resilient couplings, a pair of air bellows, said couplings and bellows each including bracket means for securing one end of each to an end of a cargo body and the other end of each to a chassis frame, said pair of resilient couplings having an elongated pivot axis adapted to be aligned with one another transversely of the forward end of a cargo carrying body and to connect said body to a chassis frame for very limited pivotal movement in a vertical plane extending lengthwise of said chassis frame, and load sensing means for said air bellows for controlling the quantity of pressurized air charged into each of said bellows and including means responsive to a change in loading on said bellows to vary the air charge in both of said bellows.

10. The combination defined in claim 9 characterized in that said air bellows each include shock absorber means extending along one lateral side of said bellows with its ends pivotally connected to the opposite ends of the associated air bellows.

References Cited
UNITED STATES PATENTS

| 3,022,749 | 2/1962 | Voertman | 105—199 |
| 3,140,083 | 7/1964 | Paul | 280—124 X |

FOREIGN PATENTS

| 1,156,599 | 12/1957 | France. |
| 1,072,487 | 12/1959 | Germany. |

OTHER REFERENCES

"Resilient Body Mounting," article in "Automobile Engineer," p. 80, February 1948.

BENJAMIN HERSH, *Primary Examiner.*

PHILIP GOODMAN, *Examiner.*